United States Patent Office 3,119,824
Patented Jan. 28, 1964

3,119,824
1-SUBSTITUTED-1,4-DIHYDRO-4-QUINAZOLONES
Homer C. Scarborough and Joseph L. Minielli, Evansville, Ind., assignors to Mead Johnson & Company, Evansville, Ind., a corporation of Indiana
No Drawing. Filed Aug. 30, 1961, Ser. No. 134,849
4 Claims. (Cl. 260—251)

The present invention is concerned with a group of 1-substituted-1,4-dihydro-4-quinazolones of the following structure, the acid addition salts thereof, with processes for the production of these substances, and with their use in the treatment of certain disease conditions.

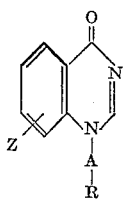

In the above formula, A is a divalent hydrocarbon radical having up to about four carbon atoms, R is phenyl, monosubstituted phenyl, or disubstituted phenyl, in which said substituents are separately or collectively halogen atoms, lower aliphatic hydrocarbon groups having up to about four carbon atoms, such as methyl, ethyl, allyl, or propyl groups, and lower alkoxy groups such as ethoxy, methoxy, or isopropoxy groups. Z is a substituent attached to one of the 5-, 6-, 7-, or 8-positions of the 4-quinazolone nucleus and represents a halogen atom, a hydrogen atom, or a lower alkoxy group having up to about four carbon atoms.

The present substances have utility as medicinals. They possess smooth muscle depressant properties and are bronchodilators. They exhibit the ability in vitro of relaxing the guinea pig tracheal spiral. A preferred member of the group, 1-benzyl-1,4-dihydro-4-quinazolone, has approximately the potency of aminophylline in inhibiting spasms of the tracheal spiral. In vivo studies in the dog and guinea pig confirm this result and further indicate that it is shorter acting and has less effect on the blood pressure than aminophylline.

This and the other products of this invention may be administered orally or parenterally in doses ranging from 2 to 60 mg./kg. of body weight to a host suffering from bronchospasm. Various types of pharmaceutical dosage formulations may be employed, including tablets, capsules, elixirs, solutions, suspensions, etc. The formulation may contain a compound of the present invention as the sole active ingredient or other active ingredients may be included to provide complementary pharmacological effects therewith. Compositions in dosage unit form containing compounds of the present invention are prepared by conventional pharmaceutical methods. For this purpose, both solid and liquid carriers, excipients, and diluents may be used, along with suspending agents, stabilizers, preservatives, lubricants, etc., as needed. Examples of suitable carriers include corn starch, lactose, calcium phosphate, polyethylene glycol, water, sesame oil, peanut oil, propylene glycol, ethanol, etc.

Several different yet related methods may be used for production of the present substances. Method A involves reaction of an appropriately N-substituted anthranilic acid with formamide. This method is illustrated by the following example.

METHOD A

*Example 1.—1-(4-Chlorobenzyl)-6-Chloro-1,4-Dihydro-4-Quinazolone*

N-(4-chlorobenzyl) - 5 - chloroanthranilic acid, 7.6 g. (0.026 mole) and 4.7 g. (0.103 mole) of formamide is heated in an open flask at 175–180° C. for 5 hrs. The viscous liquid mixture is then allowed to cool to 100° C. and 25 ml. of acetonitrile is added thereto. The crystalline product separates from the resulting solution on cooling. It is collected and recrystallized from acetonitrile yielding 3.8 g. of pure crystalline 1-(4-chlorobenzyl)-6-chloro-1,4-dihydro - 4 - quinazolone, M.P. 156–159° C.; composition determined by microanalysis: carbon, 58.8%; hydrogen, 3.42%; chlorine, 23.30%; nitrogen, 9.05%.

The necessary N-substituted anthranilic acid intermediates for this method are prepared by the reductive alkylation of the corresponding N-unsubstituted anthranilic acids with benzaldehyde, an aralkyl aldehyde, or substituted analog thereof. For instance, the intermediate required in Example 1 is prepared as follows:

*Intermediate.—N-(4-chlorobenzyl)-5-chloroanthranilic acid.*—A solution of 8.55 g. (0.05 mole) of 5-chloroanthranilic acid and 7.0 g. (0.05 mole) of p-chlorobenzaldehyde in 100 ml. of absolute ethanol is hydrogenated over freshly prepared Raney nickel catalyst at a pressure of 60 p.s.i.g. of hydrogen. Absorption of two molecular proportions of hydrogen is complete within a period of 45 minutes. The catalyst is separated by filtration and the filtrate concentrated to dryness in vacuo. The solid residue is recrystallized from acetonitrile, yielding N-(4-chlorobenzyl)-5-chloroanthranilic acid, M.P. 193–195° C.; composition observed by microanalysis: carbon, 56.86%; hydrogen, 3.79%; chlorine, 23.88%.

This method is particularly suited to the preparation of the 1,4-dihydro-4-quinazolones of the present invention which bear a substituent in the benzene ring thereof. Representative compounds which may be prepared by this method are listed in Table I. The anthranilic acids and aldehydes employed as intermediates are also listed in the table.

TABLE I.—METHOD A: 1-SUBSTITUTED-1, 4-DIHYDRO-4-QUINAZOLONES

| Product | Intermediate |
| --- | --- |
| 1-(4-Bromobenzyl)-7-methoxy-1, 4-dihydro-4-quinazolone. | p-Bromobenzaldehyde 4-Methoxyanthranilic acid. |
| 1-(2-Methylbenzyl)-7-methyl-1, 4-dihydro-4-quinazolone. | o-Tolualdehyde o-Amino-p-toluic acid. |
| 1-(2-Methyl-3-phenylpropyl)-1,4-dihydro-4-quinazolone. | α-Methylcinnamaldehyde Anthranilic acid. |

Method B involves reaction of an o-(aralkylamino)-benzamide with boiling formic acid. The o-(aralkylamino)benzamide intermediates are conveniently prepared by N-alkylation of isatoic anhydride with an unsubstituted or appropriately substituted benzyl or phenylalkyl halide to provide an N-substituted isatoic anhydride and reaction of the latter with ammonium hydroxide. Alkylation of isatoic anhydride is readily accomplished in the presence of sodium carbonate. Dimethylformamide is a convenient solvent to use in the alkylation process.

Method B is a cyclization reaction conducted by refluxing the o-(aralkylamino)benzamide with at least one molecular proportion of formic acid for several hours, followed by evaporation of any excess formic acid employed and crystallization of the residue.

The following reaction formulas illustrate Method B.

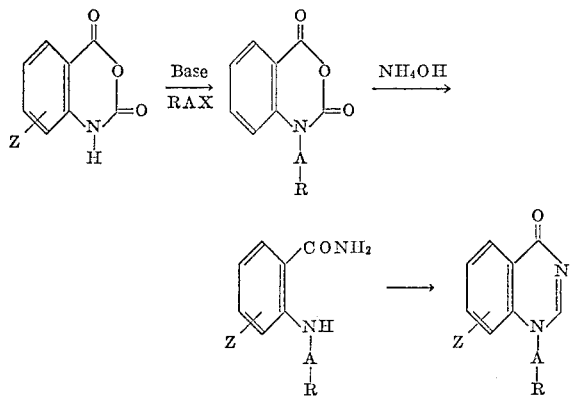

The meanings of R, A, and Z are the same as above, and X is a halogen atom, an alkyl or aryl sulfate group such as the tosyl group

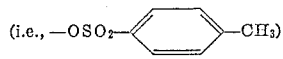

or other substituent readily replaceable by amino or amide nitrogen under alkaline alkylation conditions.

METHOD B

*Intermediate.—N-benzylisatoic anhydride.*—A solution of 20.0 g. (0.123 mole) of isatoic anhydride in 160 ml. of dimethylformamide is prepared and 13.0 g. (0.123 mole) of anhydrous sodium carbonate and 21.0 g. (0.123 mole) of benzyl bromide is added thereto. The reaction mixture is protected from moisture by a calcium chloride tube and the contents are stirred for 24 hrs. at room temperature. It is then clarified by filtration and the filtrate mixed with 800 ml. of water. An insoluble material thereupon separates and forms an emulsion. The emulsion is then extracted with chloroform several times to remove the insoluble material and break the emulsion. The extracts are washed with 200 ml. of salt water and dried over magnesium sulfate. The solvent is removed from the combined, dried extracts, yielding a light yellow oil which crystallizes on cooling. The crude product is recrystallized from acetonitrile, yielding 22.9 g. (74%) of N-benzylisatoic anhydride, white crystalline solid, M.P. 140–142° C.

The N-substituted isatoic anhydrides listed in Table II may be prepared by this method. The names of the halides from which they are derived are also listed.

TABLE II.—METHOD B: INTERMEDIATES N-SUBSTITUTED ISATOIC ANHYDRIDE

| Halide Reactant | Intermediate |
|---|---|
| 4-ClC$_6$H$_4$CH$_2$Cl | N-(4-Chlorobenzyl) isatoic anhydride. |
| C$_6$H$_5$CH$_2$CH$_2$I | N-Phenethylisatoic anhydride. |
| 2-ClC$_6$H$_4$CH$_2$Cl | N-(2-Chlorobenzyl) isatoic anhydride. |
| 3,4-Cl$_2$C$_6$H$_3$CH$_2$Cl | N-(3,4-Dichlorobenzyl) isatoic anhydride. |
| 4-CH$_3$OC$_6$H$_4$CH$_2$Cl | N-(4-Methoxybenzyl) isatoic anhydride. |
| 4-C$_2$H$_5$C$_6$H$_4$CH$_2$Cl | N-(4-Ethylbenzyl) isatoic anhydride. |
| 4-FC$_6$H$_4$CH$_2$Cl | N-(4-Fluorobenzyl) isatoic anhydride. |
| 4-BrC$_6$H$_4$CH$_2$Br | N-(4-Bromobenzyl) isatoic anhydride. |

*Intermediate.—o - (Benzylamino)benzamide.*—A solution of 30 g. (0.177 mole) of N-benzyl isatoic anhydride in 650 ml. of acetone is stirred with 100 ml. of concentrated aqueous ammonium hydroxide (28%) for 5½ hrs. The mixture is chilled and the precipitated solid collected on a filter; weight 26 g., M.P. 164–173° C. A second crop of material is obtained from the filtrate by evaporation and dilution of the concentrate with water. The second crop weighs 4 g. and exhibits M.P. 164–169° C. when heated in a capillary tube. The combined crops of crystalline product are recrystallized from 400 ml. of 2-butanone yielding 27 g. (89%) of the purified material, M.P. 169–173° C.

Alternatively and perhaps of more general utility is the use of boiling dimethylformamide as the reaction medium for the ammonolysis process.

*Intermediate.—o - (4-chlorobenzylamino)benzamide.*—N-(4-chlorobenzyl)isatoic anhydride is dissolved in 100 ml. of boiling dimethylformamide containing 50 ml. of concentrated aqueous ammonium hydroxide (28%). The mixture is boiled for 5 minutes, 100 ml. of water is added thereto, and the solution is allowed to cool. o-(4-chlorobenzylamino)benzamide separates on cooling and is collected by filtration and recrystallized from acetonitrile; 86% yield, M.P. 140–141.5° C. Composition observed by microanalysis, carbon, 64.37; hydrogen, 4.85; chlorine, 13.42.

The ortho substituted benzamides listed in Table III may also be prepared by this method from the appropriate anhydride listed in Table II.

TABLE III.—METHOD B: INTERMEDIATES SUBSTITUTED o-AMINOBENZAMIDES o-(2-phenethylamino)benzamide
o-(2-chlorobenzylamino)benzamide
o-(3,4-dichlorobenzylamino)benzamide
o-(4-methoxybenzylamino)benzamide
o-(4-ethylbenzylamino)benzamide
o-(4-fluorobenzylamino)benzamide
o-(4-bromobenzylamino)benzamide

*Example 2.—Benzyl-1,4-Dihydro-4-Quinazolone*

A solution of 10.0 g. (0.044 mole) of o-(benzylamino)-benzamide in 150 ml. of formic acid is refluxed (temperature, ca. 100° C.) for 6 hrs. and then concentrated under reduced pressure to a viscous syrup-like liquid. The latter is dissolved in 200 ml. of hot 50% aqueous ethanol, the solution cooled, and 500 ml. of cold 5% aqueous sodium hydroxide is added thereto in one lot. An oil separates which solidifies. It is collected and recrystallized from ethanol and then from acetonitrile, yielding 9.4 g. of pure, white crystalline 1-benzyl-1,4-dihydro-4-quinazolone (91%), M.P. 203–205° C. Composition observed by microanalysis: carbon, 76.39%; hydrogen, 5.10%; nitrogen, 11.98%.

By means of the method of Example 2 the 4-quinazolones listed in Table IV may be prepared from the o-(substituted aralkyl amino)benzamides listed in Table III.

TABLE IV.—METHOD B: 1-SUBSTITUTED-1,4-DIHYDROQUINAZOLONES FROM o-(ARALKYLAMINO)BENZAMIDES 1-(4-chlorobenzyl)-1,4-dihydro-4-quinazolone
1-(2-phenethyl)-1,4-dihydro-4-quinazolone
1-(2-chlorobenzyl)-1,4-dihydro-4-quinazolone
1-(3,4-dichlorobenzyl)-1,4-dihydro-4-quinazolone
1-(4-methoxybenzyl)-1,4-dihydro-4-quinazolone
1-(4-ethylbenzyl)-1,4-dihydro-4-quinazolone
1-(4-fluorobenzyl)-1,4-dihydro-4-quinazolone
1-(4-bromobenzyl)-1,4-dihydro-4-quinazolone In some cases a given substituted o-(arylkylamino)-benzamide may deteriorate on refluxing with formic acid according to the method of Example 5. In such instances, the substituted o-(aralkylamino)benzamide is heated with ethyl orthoformate or other lower alkyl orthoformate rather than formic acid with the successful production of the desired 1-substituted-1,4-dihydro-4-quinazolone. This constitutes Method C and is illustrated by the following example.

METHOD C

*Example 3.—1-(3,4-Dimethoxybenzyl)-1,4-Dihydro-4-Quinazolone*

A mixture of 53 ml. of ethyl orthoformate and 10.6 g. (0.037 mole) of o-(3,4-dimethoxybenzylamino)benzamide is heated to boiling in a flask equipped with an air condenser arranged so that the ethanol formed in the course of the reaction escapes from the top of the condenser without condensing and returning to the flask. After approximately 3 hrs., ethanol evolution ceases and the reaction mixture is cooled to 5° C. A solid separates and is collected, recrystallized from acetonitrile, and then from dimethylformamide furnishing 6 g. (55%) of the pure crystalline product, M.P. 225.5–228° C. The composition observed on microanalysis is carbon, 68.75; hydrogen, 5.50; and nitrogen, 9.41.

The o-(3,4-dimethoxybenzylamino)benzamide required in the preceding example is prepared from the corresponding isatoic anhydride which is obtained by alkylation of isatoic anhydride with 3,4-dimethoxybenzyl chloride as indicated above. The latter is obtained by reaction of 3,4-dimethoxybenzyl alcohol with hydrogen chloride. The physical properties of these intermediates are listed below.

3,4-dimethoxybenzyl chloride, M.P. 47–50° C.
N-(3,4-dimethoxybenzyl)isatoic anhydride, M.P. 175–177° C.; anal.: C, 65.26; H, 4.87; N, 4.56.
o-(3,4-dimethoxybenzylamino)benzamide, M.P. 148.5–150.5° C.; anal.: C, 66.93; H, 6.27; N, 9.81.

Dosage unit forms such as tablets or capsules for oral use and ampoules of suspensions or solutions of the substances described for injection containing from 100 to 750 mg. of active ingredient are ordinarily suitable for practise of the present invention. The following example serves as an illustration of one such composition. It refers to a hard gelatin capsule containing 400 mg. of 1-benzyl-1,4-dihydro-4-quinazolone. Larger and smaller dosage units are prepared in similar fashion containing this or other substances disclosed and claimed herein.

*Example 4*

A dry blend of the following ingredients is prepared:

| | Kg. |
|---|---|
| 1-benzyl-1,4-dihydro-4-quinazolone | 20.0 |
| Lactose | 4.8 |
| Magnesium stearate | 0.2 |
| | 25.0 |

This mixture is then used to fill hard gelatin capsules each with 500 mg. of the blend.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

What is claimed is:
1. A compound selected from the group consisting of

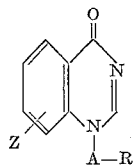

and the pharmaceutically acceptable acid addition salts thereof wherein A is alkylene having up to about four carbon atoms, R is selected from the group consisting of phenyl, monosubstituted phenyl, and disubstituted phenyl, wherein said substituents are selected from the group consisting of halogen, lower alkyl, lower alkenyl, and lower alkoxy, and Z is selected from the group consisting of hydrogen, halogen, and lower alkoxy.

2. 1-benzyl-1,4-dihydro-4-quinazolone.
3. 1 - (4 - chlorobenzyl) - 6 - chloro - 1,4 - dihydro - 4 - quinazolone.
4. The process which comprises the steps of heating at a temperature in excess of 100° C. reactant I selected from the group consisting of an anthranilic acid of the formula

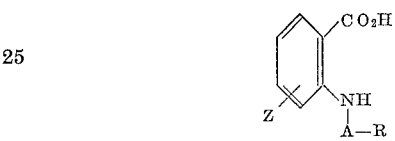

wherein A is an alkylene radical having up to about four carbon atoms, R is selected from the group consisting of phenyl, monosubstituted phenyl, and disubstituted phenyl, wherein said substituents are selected from the group consisting of halogen, lower alkyl, lower alkenyl, and lower alkoxy, and Z is selected from the group consisting of hydrogen, halogen, and lower alkoxy, and the amide thereof with reactant II selected from the group consisting of formic acid, the lower alkyl ortho esters thereof, and formamide, and recovering resulting 1-substituted-1,4-dihydro-4-quinazolone, one and only one of said reactants I and II being a carboxamide of the group specified.

References Cited in the file of this patent
UNITED STATES PATENTS

| 2,439,386 | Guenther et al. | Apr. 13, 1948 |
| 2,675,341 | Shelanski et al. | Apr. 13, 1954 |
| 2,780,577 | Phillips et al. | Feb. 5, 1957 |
| 2,915,521 | Laubach et al. | Dec. 1, 1959 |